United States Patent
Steffens et al.

(10) Patent No.: US 6,223,189 B1
(45) Date of Patent: Apr. 24, 2001

(54) SYSTEM AND METHOD USING METALANGUAGE KEYWORDS TO GENERATE CHARTS

(75) Inventors: Susan H. Steffens; Richard Yonts, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/001,853

(22) Filed: Dec. 31, 1997

(51) Int. Cl.[7] .............................. G06F 15/00; G06F 17/00
(52) U.S. Cl. ............................................ 707/503; 707/503
(58) Field of Search .................................... 707/502, 503, 707/501, 500, 515, 514, 528–531, 542, 101–102; 345/418, 430–431, 440, 441–443, 467, 468, 116, 133, 140, 150; 709/200–201, 203

(56) References Cited

U.S. PATENT DOCUMENTS

| | | | |
|---|---|---|---|
| 5,204,960 | 4/1993 | Smith et al. | 717/7 |
| 5,375,201 | 12/1994 | Davoust | 707/503 |
| 5,555,357 | * 9/1996 | Fernandes et al. | 345/441 |
| 5,581,678 | 12/1996 | Kahn | 345/440 |
| 5,611,035 | * 3/1997 | Hall | 345/440 |
| 5,634,133 | * 5/1997 | Kelley | 707/503 |
| 5,999,193 | * 12/1999 | Conley, Jr. et al. | 345/440 |

OTHER PUBLICATIONS

G. Tagaras, "Dynamic control charts for finite production runs," European Journal of Operation Research, vol. 91(1), May 24, 1996, p. 38–55.

Abstract, V.B. Godin, Industrial Engineering, "Lotus 1–2–3 can produce dynamic graphic simulation without stops in the program," Mar. 1988.

Abstract, Jiang Zhu et al., Journal of System Software, "HaRTS: performance–based design of distributed hard real–time software", Feb. 1996.

ImageStream Graphics and Presentation Filters, http://www.inso.com/imstream.html, Jun. 30, 1997.

Mike Heck, Infoworld DeltaGraph Pro 3 Streamlines (Mac) Interface, http://www.deltapoint.com/dgpro/dg10001.html, Jun. 30, 1997.

MacUser—the Mac's premier business–charting program . . . , http://www.deltapoint.com/dgpro/dg10003.html Jun. 30, 1997.

Data Views Corporation Europe, http://www.dataviews.co.uk/html/products.html, Jun. 11, 1997.

SpaceCharts Data Sheet SpaceCharts Java–based 3–Dimensional Charting Package, http://www.infospace–inc.com/docs/webchart/datacht.html, Jun. 30, 1997.

DFSMS Optimizer User's Guide and Reference Version 1 Release 1,Fourth Edition (Apr. 1997), IBM Corp.

DFSMS Optimizer User's Guide and Reference, Version 1 Release 1, Third Edition (Jun., 1996), IBM Corp.

* cited by examiner

Primary Examiner—Joseph H. Feild
Assistant Examiner—Alford W. Kindred
(74) Attorney, Agent, or Firm—Donald J. Pagel

(57) ABSTRACT

A charting metalanguage for uniquely defining a chart to be generated by a computer. The charting metalanguage comprises a plurality of keywords and subkeywords that define the components of the chart. A keyword is preceded by an indicator such as a slash symbol and describes a major characteristic of the chart such as the type of chart, the type of font to be used or the title of the chart. An optional subkeyword follows the keyword. A text and/or data string may follow the subkeyword and/or be positioned between the keyword and the subkeyword.

14 Claims, 2 Drawing Sheets

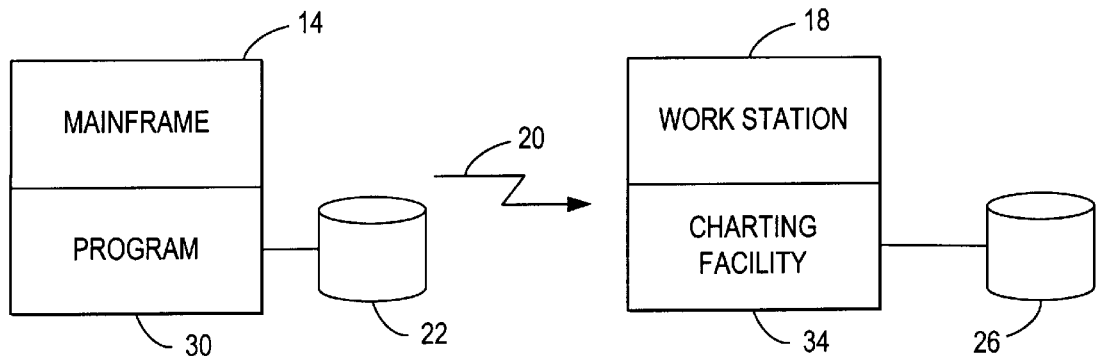

FIG. 1

/Filident
/Rptident
/Footnote
/Domaintitle
/Rangetitle
/Legendtitle
/Title
/Subtitle
  These keywords are followed by any text string
    If multiple subtitle keyword are found they are counted as subtitle 1, 2, 3, ...
/Chart
  followed by one of Pie, Table, Area, Line, Txt, Bar, Column
  These subkeywords can be followed by Stacked
/Domainlabel
/Rangelabel
/Legendlabel
  These keywords are followed by text strings separated by commas
/Data
  followed by one or more data elements separated by commas
/Font
  followed by one of Title, Subtitle, Footnote, Legendlabel, Domaintitle,
   Domainlabel, Rangetitle, Rangelabel, Datalabel
  These subkeywords are followed by a font name & a font size
  The font size is optionally followed by the subkeyword forecolor & a color
   and/or the subkeyword Backcolor & a color
/Color
  followed by Legendlabel, a number specifying which legend color & a color
/Set
  followed by one of Outline, Shadow, Rangeaxislines, invertlegend, invertseries,
   These keywords are followed by On or Off
  or Set is followed by Gap, Overlap, Num & then a number

FIG. 2

/CHART, BAR
/TITLE, Management Class Total Cost Summary
/FONT title Helvetica 12 bold forecolor yellow backcolor blue
/SUBTITLE, Migration Storage Average Size per Day
/FONT subtitle Helvetica 12 bold forecolor yellow backcolor blue
/FOOTNOTE left ABC Muffin Co. - 33 days
/FOOTNOTE right MRTCMSIZ - 05/07/1997-12:01:16P.M.
/FONT footnote Helvetica 12 bold forecolor black backcolor yellow
/LEGENDTITLE, null
/LEGENDLABEL, L0, ML1, ML2
/FONT legendlabel Helvetica 12 bold forecolor black backcolor yellow
/COLOR legendlabel 0 magenta
/COLOR legendlabel 1 pink
/COLOR legendlabel 2 cyan
/DOMAINTITLE, Management Class
/FONT domaintitle Helvetica 12 bold forecolor red backcolor lightgray
/DOMAINLABEL, STANDARD, MAN_MIG, EXT_ REDU, MAN_BKUP, MAN_DEL, AUTO_DEL
/FONT domainlabel Helvetica 12 bold forecolor black backcolor lightgray
/RANGETITLE, Bytes per Day
/FONT rangetitle Helvetica 12 bold forecolor red backcolor lightgray
/RANGELABEL,
/FONT rangelabel Helvetica 12 bold forecolor black backcolor lightgray
/DATA, 43912385596,0,0,0,0,0
/DATA, 5203820502,0,0,0,0,0
/DATA, 7144659843,421443040,0,0,0,0

(etc., etc.,)

FIG. 3

SYSTEM AND METHOD USING METALANGUAGE KEYWORDS TO GENERATE CHARTS

TECHNICAL FIELD

The present invention relates to a method for generating chart definitions on a computer and more particularly to a method in which the instructions needed for generating the chart includes information about the appearance of the chart. This information can be interpreted by programs running on different platforms such as OS/2®, Windows MacIntosh®, and Unix® platforms.

BACKGROUND ART

Current charting packages are very user intensive. When transferring a chart between computers, a user must frequently redesign and/or customize the chart before using it. This is time consuming and tedious for large numbers of charts, with no guarantee of consistency between similar charts. What is needed is a way to completely and uniquely describe a chart in a format that can be transferred between different computers.

SUMMARY OF THE PRESENT INVENTION

Briefly, the present invention comprises a system and method for creating a chart based on a metalanguage file that completely defines the chart. The metalanguage file comprises a plurality of keywords that specify the major characteristics of the chart. For example, the keywords specify the type of chart to be created (pie chart, bar chart etc.), the title of the chart, the titles of the axes in the chart, the footnotes to be used with the chart and the types of fonts and colors to be used in the chart. Where relevant, the keywords are followed by data entries that denote specific information to be listed in connection with the major characteristic of the chart, such as the actual name of the chart. Additionally, subkeywords can follow the keywords to further define features of the characteristic designated by the keyword.

The metalanguage file is stored on a first computer. When a user at a second computer needs to generate the chart, the metalanguage file is downloaded from the first computer to the second computer. A charting program on the second computer parses the metalanguage file to determine the characteristics of the chart and then generates a chart with the exact style and content specified by the metalanguage file.

BRIEF DESCRIPTION OF THE DRAWINGS

FIG. 1 is a schematic diagram of a computer system that utilizes the charting metalanguage of the present invention;

FIG. 2 lists the keywords and subkeywords used in the charting metalanguage of the present invention; and FIG. 3 is a partial metalanguage file of a chart according to the present invention.

DETAILED DESCRIPTION OF THE PREFERRED EMBODIMENT

FIG. 1 illustrates a computer system 10 that utilizes the chart formatting sublanguage (charting metalanguage) of the present invention. A first computer 14 is in communication with a second computer 18 as is indicated by the arrow 20. The first and second computers 14 and 18 can be any type of computer such as a main frame computer or a personal computer, and can be running any type of operating system such as OS/2®, Windows®, MacIntosh® or Unix®.

In the preferred embodiment, the computer 14 is an IBM OS/390 mainframe that is attached to a direct access storage device (DASD) 22. The computer 18 is a workstation running the OS/2® operating system and is connected to a DASD 26. The computers 14 and 18 communicate with each other using the TCP/IP protocol, but other communication protocols could also be used.

A chart generation program 30 runs on the first computer 14 for assembling data stored on the DASD 22 into a chart. The program 30 creates the chart using the charting metalanguage of the present invention to format the chart. The formatted chart is stored on the DASD 22 as a metalanguage dataset. In response to a request from the computer 18, the dataset is transmitted to the computer 18 where a charting facility program 34 interprets the metalanguage dataset and recreates the desired chart.

In the preferred embodiment, the program 30 is a program such as IBM's DFSMS Optimizer™ program. However, other data collecting programs can also be modified to function as the program 30. In the preferred embodiment, the charting facility program 34 is a Java™ program such as IBM's Optimizer Charting Facility™ program. However, other charting facility programs, such as Lotus 1-2-3™ and Freelance Graphic™, can also be modified to function as the program 34. Such programs can be written in other programming languages such as C++ or Basic.

The charting metalanguage of the present invention comprises an entry having the following form: token keyword optional data optional subkeyword(s) optional data. In the preferred embodiment the token is always the slash symbol "/". In the preferred embodiment, the token always appears in column one of the .CHT file. The purpose of the token is to signal the presence of a keyword, thereby making parsing of the keywords easier. In other words, the token immediately precedes the keyword and indicates that the entry following the token is a keyword. Of course, other symbols could be used as the token and the token could appear in other positions.

The keywords and subkeywords are selected from the list shown in FIG. 2, may be written in upper or lowercase and may be of any length. The data can be any combination of alphanumeric characters (one or more alphanumerics) and different data and/or text entries can be separated by commas or blanks. In the preferred embodiment, the text strings and/or data entries following certain keywords can be subject to different rules, as is indicated in FIG. 2. For example, the text strings and/or data entries following certain keywords can be separated by commas or spaces (e.g. filident, rptident, footnote, domaintitle, rangetitle, legendtitle, title, subtitle). The members of this group of keywords are arbitrarily referred to as primary keywords.

Similarly, in the preferred embodiment, text strings and/or data entries following certain keywords are always separated by commas (e.g. /Domainlabel, /Rangelabel, /Legendlabel and /Data). The members of this group of keywords are arbitrarily referred to as secondary keywords. In other embodiments, the data entries following secondary and/or tertiary keywords could be separated by spaces and/or other symbols.

A chart is uniquely and reproducibly formatted by creating a sufficient number of lines of metalanguage to completely describe the chart. The lines of metalanguage are written one after another, preferably with each new line beginning with the token followed by a keyword. Preferably, whenever a new keyword is used, it is placed on a new line. FIG. 3 illustrates a partial metalanguage dataset for a representative bar chart.

The function of the keyword is to describe a major element of the chart, such as the type of chart, the title of the chart and/or the footnotes to be used in the chart. A more complete list of the types of keywords used in the present invention is given in FIG. 2.

The function of the subkeyword is to specify an area to which the keyword is to be applied or to add other information necessary to properly execute the function specified by the keyword. A subkeyword follows a keyword and is separated from the keyword by a space or a comma (preferably a space), but is not preceded by the token.

A chart is composed of multiple chart elements, all of which are described by the charting metalanguage. These chart elements are optional, and if not specified, most parts are defaulted. The only case in which any data is defaulted is when too few data elements are input to the chart definition. All chart elements have modifiable parts. The chart elements are:

| | | |
|---|---|---|
| Title | font, | color |
| Subtitles | font, | color |
| Footnote | font, | color |
| Domain title | font, | color |
| Range title | font, | color |
| Legend title | font, | color |
| Domain labels | font, | color |
| Range labels | font, | color |
| Legend labels | font, | color |
| Data labels | font, | color |
| Data | colors | |

The types of modifications that can be made in these chart elements are:

Font: The modifications include face name, point size, modifiers (bold and/or italic)

Color: The modifications include background, foreground

Colors: The modifications include legend item colors

The types of charts that can be created using the metalanguage include pie charts, table charts, area charts, text charts, bar charts, donut charts, line charts, multicolumn charts, bullet charts and column charts. The definitions of these chart types used in the preferred embodiment, are given below. However, it should be appreciated that the definition of a particular type of chart can be modified as needed.

The AREA chart will work like a line chart with the area between the X-axis and the line filled in with the color associated with the legend element.

The AREA chart has three styles: NORMAL which causes later drawn legend elements to overlay previously drawn data, STACKED which causes the previous legend element to be the base line for the current legend element and the current legend element drawn with its values summed with its baseline, and PERCENT where each legend element represents its percentage of the entire height of the chart. In all cases the area between the current legend element line and its base line is filled in with the legend element's color.

The BAR chart displays data in a histogram with the rectangles growing from the Y-axis over toward the right of the chart. It displays the number of domain elements defined by the RANGEELEMENTS control.

The BAR chart has three styles: NORMAL which shows side-by-side (with optional overlap) rectangles for each legend element separated by optional space between the domain elements, STACKED where each legend element is abutted to the right of its predecessor in the domain element, and PERCENT where each legend element describes its percentage of the sum of the entire domain element and the legend elements are abutted with the right being at the maximum width of the chart.

BULLET charts display textual (alphanumeric) data in an indented list format. The data is in two columns, the first represents the level of indentation but is not displayed, and the second is the data to be displayed visually.

The COLUMN chart displays data in a histogram with the rectangles growing from the X-axis up toward the top of the chart. It displays the number of domain elements defined by the DOMAINELEMENTS control.

The COLUMN chart has three styles: NORMAL which shows side-by-side (with optional overlap) rectangles for each legend element separated by optional space between the domain elements, STACKED where each legend element is stacked on top of its predecessor in the domain element, and PERCENT where each legend element describes its percentage of the sum of the entire domain element and the legend elements are stacked with the top being at the maximum height of the chart.

The DONUT chart preserves the distinction of legend data within domain data elements. The chart is displayed as concentric rings, one per domain item. The chart starts with the first legend item of the each domain aligned on a starting position, say on the X-axis line of the first quadrant of a Cartesian graph. Each legend item then fills its percentage of the whole circle.

The LINE chart draws each legend element as a line representing the range value of each domain element across the chart for as many elements as specified by DOMAINELEMENTS.

The LINE chart has three styles: NORMAL which causes later drawn legend elements to overlay previously drawn data, STACKED which causes the previous legend element to be the base line for the current legend element and the current drawn with its values summed with its baseline, and PERCENT where each legend element represents its percentage of the entire height of the chart.

MULTICOLUMN text charts display textual (alphanumeric) data as a spread sheet type matrix. The data is displayed in columns under headings which are the DOMAINLABELs.

The PIE chart displays the data as a circle with each domain element being denoted by its percentage of the total circle. If multiple legend elements comprise a domain element, then the entire domain element is the sum of the legend elements. For example, if the chart were displaying first, second, and third quarter results, then the normal circle would have three segments. If, however, the data were additionally broken down into widgets one and two, each quarter would display the sum of their widgets. In so doing, the distinction between the widgets per quarter is lost. If this is unacceptable, the DONUT chart preserves this distinction.

In the preferred embodiment, the keywords and subkeywords listed in FIG. 2 have the following definitions:

The COLOR element allows the changing and setting of colors for various control elements, such as titles and labels.

Format: COLOR [element] [n, foreground color, background color]

[color [, color [, . . . ]] {n|1 . . . 6}

EXAMPLE

/color title foreground black background darkgray to set title text to black on a dark gray background.

The CHART element begins the definition of a new chart.

Format: CHART [numeric, text] [column, pie, bar, . . . ] [normal, stacked, percent]

At least one DEPTH control element needs to have been processed prior to the first CHART control element.

EXAMPLE

/chart area percent to create an area chart with the data spread out to represent a percentage.

The DATA keyword has the following meaning: All of the data for a chart, either numeric or text, will consist of a sequence of strings. If the chart is a numeric chart, these values will be converted to their numeric equivalents; text will be handled as is. DATA control elements will be read sequentially and applied to the data in the following way:

---

DOMAIN[0]LEGEND[0], DOMAIN[1]LEGEND[0], . . . DOMAIN[n]LEGEND[0],
DOMAIN[0]LEGEND[1], DOMAIN[1]LEGEND[1], . . . DOMAIN[n]LEGEND[1],
.          .          .
.          .          .
.          .          .
DOMAIN[0]LEGEND[m], DOMAIN[1]LEGEND[m], . . . DOMAIN[n]LEGEND[m]
Format: DATA string [, string [, . . . ]]

---

DATA elements can appear in any order within a chart specification. No particular number of elements need occur with any DATA control line. For example, for a 3×4 chart, one DATA control could have twelve elements, or twelve DATA controls could be read from the specification. Missing or extraneous data will be handled per the Error clause.

The DOMAINLABEL and LEGENDLABEL controls must be included to specify any number of data elements other than the default of one. For example, if neither appeared, only one element of data would be used for the chart; if either but not both are missing then the number of label elements will specify either the number of domain elements or legend elements with the other being defaulted to one. If both appear, then their number of elements determines the matrix bounds for the data and the number of elements for each.

If too few data elements are received, as based on the number of domain labels and the legend labels, the data will be padded with zeroes for numeric and null strings for text charts and a warning message issued to the debug file. If too many elements are received, the data will be ignored and a warning message issued to the debug file.

EXAMPLE

/data apples, oranges, bananas, passion fruit
to specify four data elements, or
/data 9.3,20000000,−96.32,7
/data 3.14159
/data 4,44,14
to specify eight data elements for a 1×8, 2×4, 4×2 or 8×1 data matrix The DATA control element describes the level in which the following charts fit within the hierarchy of all charts. If some charts are sub-parts of a report, they are at the depth level of that report, whereas other charts are sub-parts of another report. While these charts may be at the same depth level, they are under different report levels, therefore, under different parts of the hierarchy. When all the depth levels and charts are described, they form a tree where the leaf nodes are charts and the intermediate nodes are depth levels.

Format: DEPTH [+1, −1, n] {n|1 . . . 16}

The first control element needs to be a DEPTH control to begin the hierarchy. Comments are excluded from this requirement.

Any control elements that occur prior to the first DEPTH control are discarded with errors logged.

EXAMPLES

/depth 1
to start a highest level of depth ordering, or
/depth
to descend to the next level of depth.

The DOMAINELEMENTS control describes the maximum number of viewable elements to be described along the range or X-axis when a multicolumn text chart or almost any numeric chart is displayed. Its main intent is to limit the number of items in larger charts to prevent overlapping of labels. Further, if a certain group of data makes sense to display together, this can be used to control the grouping (e.g., for a chart showing monthly statistics, it might be beneficial to set the number to seven to visually group data by weeks).

Format: DOMAINELEMENTS [n] {n|0 . . . 255}

If DOMAINELEMENTS specifies an invalid number of elements (i.e., too many, less than one), the actual number of elements is used, as is the case when no number is specified.

EXAMPLE

/domainelements 7
to view only seven elements across the domain, or
/domainelements
to view the actual number defined by the DOMAINLABEL control The DOMAINLABEL control contains the text labels that describe each domain element. If no labels are defined, the default is to use a single null string.

Format: DOMAINLABEL string [, string [, . . . ]]

The DOMAINLABEL control needs to specify the exact number of elements that are used to define the data since it defines one bound of the data matrix.

Any errors encountered will cause the control to be discarded, an error message logged, and finally the whole chart to be discarded.

EXAMPLES

/domainlabel Day 1,Day 2,Day 3,Day 4,Day 5, Day 6, Day 7 to set seven day's names as domain labels The DOMAINTITLE control contains the title that describes the domain elements, typically drawn across the X-axis.

Format: DOMAINTITLE string Invalid strings cause the control to be ignored and an error message to be logged.

EXAMPLE

/domaintitle Quarter
to title the domainaxis for quarters

The FONT control element specifies font characteristics of the next chart element and remains so until it is changed again or reset when a default element definition is encountered.

Format: FONT element [facename] [n] [bold] [italic] [nobold] [noitalic]

Element refers to any of the chart elements that use fonts (e.g., title, subtitle, range labels, etc.), If no options are specified, the default behavior is to return to using the default font characteristics of a control element. Otherwise, the current font is changed to the specifications of the FONT control element, overriding the previous settings. When a control element is encountered after a reset (i.e., FONT with no options) the font is overlaid with the new control's font definition and becomes the default font for the particular chart element.

If no chart element is specified, an error message is logged and processing continues as if no FONT control was read.

If a facename is specified that does not exist, then some matching is attempted. If nothing comes close, the default font is used.

EXAMPLE

/font title helvetica 14 bold italic to specify a new default font for all following title control elements, or /font title to return to using the title control's defaults, or /font title noitalic to modify the current title font by removing a characteristic FOOTNOTE specifies optional data that will appear at the bottom of the chart. Any duplicate specifications for a footnote will use the last one with the prior one(s) discarded. Footnote data is optional and defaults to null strings and no space reserved on the chart for their display.

Format: FOOTNOTE [right, left] string

If the width of a footnote or the combined width of both exceed the width of the chart, then the footnotes are left aligned and truncated to the size that fits. If one footnote is less than half the width to the footnote line, but both exceed the width, the shorter will be displayed in its entirety with t other being abutted with a gutter and truncated.

EXAMPLE

/footnote left Chart creation date 09/05/96 to specify a left aligned, left handed footnote or

/footnote right Time: 12:30

/footnote left Date: January 17, 1997 to specify a left aligned, left handed footnote and a right aligned, right handed footnote The LEGENDLABEL describes the text for each item in the legend. It defaults to a single null string.

Format: LEGENDLABEL [string [,string . . . ]]]

The LEGENDLABEL control defines one bound of the data matrix so it must contain the exact number of legend elements to properly define the data.

If any errors are detected with the LEGENDLABEL control, the control is discarded, an error is logged and the whole chart is discarded.

EXAMPLE

/legendlabel apples,bananas,oranges,strawbarries to set four legend items as fruit.

LEGENDTITLE indicates that the legend box can be titled with the supplied text. This would appear above the box and describe the entries. Presumably this would further describe the legend items in a way different than the RANGETITLE would.

Format: LEGENDTITLE string

EXAMPLE

/legendtitle Types of fruit to set legend title to types of fruit

The RANGEELEMENTS control describes the maximum number of viewable elements to be described along the range or Y-axis when a multi-column text chart or a bar chart is displayed. Its main intent is to limit the number of items in larger charts to prevent overlapping of labels. Further, if a certain group of data makes sense to display together, this can be used to control the grouping (e.g., for a chart showing monthly statistics, it might be beneficial to set the number to seven to visually group data by weeks).

Format: RANGEELEMENTS [n] In {0 . . . 255}

If RANGEELEMENTS specifies an invalid number of elements (i.e., too many, less than one), the actual number of elements is used, as is the case when no number is specified.

EXAMPLE

/rangeelements 10 to limit the number of range data to ten elements.

The RANGELABEL keyword allows the specification of range labels for textual (non-numeric) charts. Textual charts can not calculate range labels and therefore they must be specified. These labels will be ignored for numeric charts.

Format: RANGELABEL string [, string [, . . . ]]

EXAMPLE

/rangelabel 1Q,2Q,3Q,4Q to set textual chart range labels to quarters.

The RANGETITLE control element describes what is usually known as the Y-axis title. This title describes the range that the data encompasses and what each range increment means.

Format: RANGETITLE string

Any RANGETITLE element that is read with an invalid text string is discarded and an error message is logged.

EXAMPLE

/rangetitle Dollars per Bushel to set the range title for the range as dollars/bushel.

The SET control element is a miscellaneous, catch-all to collect various and sundry options that need modifying but are not common across all chart types or are not essential elements of a chart. Additional subkeywords that follow the set keyword are shown in FIG. 2.

DATALABEL

Format: DATALABEL [on|off|top|bottom|middle|total]

AXIS

Format: DOMAINAXIS [on|off]

RANGEAXIS [on|off]

LINEWIDTH

Format; LINEWIDTH n

SEGMENTEXPLODE

LEGEND

Format: SET option parameter [option parameter [ . . . ]]

All options must come in pairs of option parameters with options processed afterwards overriding similar options processed earlier.

Invalid options and parameters are discarded and an error message is logged.

EXAMPLE

/set linewidth 5
to set the line drawing width to five pixels, or
/set datalabels top
to put datalabels at the top of its associated graphic element
/set domainaxis on rangsaxis on
to make the data displayable on a background grid A SUBTITLE control element defines a string of text that is displayed under the main title. The subtitles are displayed in sequence that they are read, with each new one centered under the previous; the first is directly under the main title.

Format: SUBTITLE string

Any SUBTITLE element that has an invalid text string is discarded and an error message logged.

EXAMPLE

/subtitle Production per Quarter
to set a subtitle as production.

The TITLE control element describes the main title of a chart. It is separate in its modifiable parts from the subtitles and always is the topmost title in the set of titles and subtitles.

Format: TITLE string

Any TITLE control that does not have a proper string is discarded and an error logged.

EXAMPLE

/title Yearly Production of 3.5" Hard disks
to set the main title as production.

In the preferred embodiment, the charting metalanguage file comprises one or more of the following keywords: filident, rptident, footnote, domaintitle, rangetitle, legendtitle, title, subtitle, chart, domainlabel, rangelabel, legendlabel, data, font, color or set.

In a preferred example, the charting metalanguage file includes the keyword "font" immediately preceded by the slash symbol and followed by one or more of the subkeywords selected from the group consisting of title, subtitle, footnote, legendlabel, domaintitle, domainlabel, rangetitle, rangelabel or datalabel. Each keyword is immediately preceded by the slash symbol. A text string follows the subkeyword that specifies at least the font type and font size for the indicated subkeyword. Note that in this example, the subkeywords are keywords functioning as subkeywords because of there position after a keyword.

Other preferred keywords include a color keyword that specifies the color of a section of the chart; a domainelement keyword that specifies the maximum number of viewable elements along the x-axis of the chart; a rangeelements keyword that specifies the maximum number of viewable elements along the y-axis of the chart; and a rangetitle keyword that specifies the title to be associated with the y-axis of the chart.

In use, the charting metalanguage file is downloaded from the first computer 14 to the second computer 18 where the charting facility program 34 parses the charting metalanguage file. The program 34 then generates a chart having all of the characteristics that were defined by the metalanguage file.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A charting metalanguage for defining a chart comprising:

one or more tokens;

at least one primary keyword that specifies a characteristic of a chart, each primary keyword being preceded by at least one token, the primary keyword being selected from the group consisting of domaintitle, rangetitle, legendtitle, title, and subtitle; and a text string following at least one primary keyword, wherein the primary keyword domaintitle, if used, contains a title in the text string that describes domain elements, the primary keyword rangetitle, if used, describes a Y-axis title in the text string, the primary keyword legendtitle, if used, contains a title for a legend box in the text string, the primary keyword title, if used, contains a main title of a chart in the text string, and the primary keyword subtitle, if used, contains a title that appears under the main title in the text string, and wherein the presence of one of the one or more tokens indicates that one of the primary keywords follows the token.

2. The charting metalanguage of claim 1 wherein the primary keyword is written in lower case letters.

3. The charting metalanguage claim 1 wherein the text string includes a plurality of entries separated by spaces.

4. The charting metalanguage of claim 1 further comprising:

at least one secondary keyword selected from the group consisting of domainlabel, rangelabel and legendlabel; and at least one of the secondary keywords being followed by a text string having entries separated by commas.

5. The charting metalanguage of claim 1 further comprising:

at least one use of the keyword "chart" followed by at least one subkeyword selected from the group consisting of pie, table, area, line, text, bar and column.

6. A method for generating a chart comprising:

creating a charting metalanguage file for defining a chart, the charting metalanguage file including at least one keyword selected from the group consisting of domaintitle, rangetitle, legendtitle, title, subtitle, chart, domainlabel, rangelabel, legendlabel, data, font, color and set each keyword being preceded by at least one token wherein the token indicates that at least one keyword follows the token;

downloading the charting metalanguage file from a first computer to a second computer; and parsing the charting metalanguage file with a software program running on the second computer for generating charts.

7. The method of claim 6 further comprising:

displaying a chart generated by the software program from the charting metalanguage file.

8. A system for generating a chart comprising:

a first computer;

a charting metalanguage file stored on the first computer for defining a chart, the charting metalanguage file including at least one keyword selected from the group consisting of domaintitle, rangetitle, legendtitle, title, subtitle, chart, domainlabel, rangelabel, legendlabel, data, font, color and set each keyword being preceded by at least one token, wherein the token indicates that at least one keyword follows the token;

a second computer adapted for receiving the charting metalanguage file from the first computer; and software means running on the second computer for generating a chart based on the charting metalanguage file.

9. A charting metalanguage for defining a chart comprising:

one or more tokens;

one or more subkeywords selected from the group consisting of title, subtitle, footnote, legendlabel, domaintitle, domainlabel, rangetitle, rangelabel and datalabel;

a font keyword preceded by at least one of the tokens and followed by at least one of the subkeywords, wherein the presence of one of the one or more tokens indicates that the font keyword follows the token and the font keyword is separated from the subkeyword by a space; and a text string following the subkeyword that specifies at least the font type and font size for the subkeyword.

10. The charting metalanguage of claim 9 further comprising:

a color keyword that specifies the color of a section of the chart.

11. The charting metalanguage of claim 10 further comprising:

one or more indicators that specify whether the color should be applied to the foreground or to the background of the section of the chart.

12. The charting metalanguage of claim 9 further comprising:

a domainelement keyword that specifies the maximum number of viewable elements along the x-axis of the chart.

13. The charting metalanguage of claim 9 further comprising:

a rangeelements keyword that specifies the maximum number of viewable elements along the y-axis of the chart.

14. The charting metalanguage of claim 9 further comprising:

a rangetitle keyword that specifies the title to be associated with the y-axis of the chart.

* * * * *